United States Patent [19]

Sabatka

[11] 4,204,913
[45] May 27, 1980

[54] SOLVENT RECOVERY APPARATUS

[75] Inventor: Winston E. Sabatka, Lakeville, Minn.

[73] Assignee: Finishing Equipment, Inc., St. Paul, Minn.

[21] Appl. No.: 894,045

[22] Filed: Apr. 6, 1978

[51] Int. Cl.² ............................ B01D 3/00; B08B 7/04
[52] U.S. Cl. ..................................... 202/168; 202/170; 202/185 R; 202/206; 203/2; 134/12; 134/109
[58] Field of Search ......................... 203/1, 20, 99, 2; 134/12, 109, 105–108; 202/181, 185 R, 206, 170, 182, 160, 168, 169

[56] References Cited

U.S. PATENT DOCUMENTS

| | | | |
|---|---|---|---|
| 2,001,956 | 12/1936 | Smith et al. | 202/160 |
| 2,310,569 | 9/1943 | Booth | 134/12 |
| 2,771,086 | 11/1956 | Kearney | 202/170 |
| 3,896,829 | 7/1975 | Sabatka | 134/58 |
| 4,003,798 | 1/1977 | McCord | 202/170 |

*Primary Examiner*—Wilbur L. Bascomb, Jr.
*Attorney, Agent, or Firm*—Kinney, Lange, Braddock, Westman & Fairbairn

[57] ABSTRACT

A dirty or otherwise contaminated volatile solvent or other treatment fluid including relatively more volatile non-flammable and relatively less volatile flammable constituents is recovered or reclaimed by boiling it off from its impurities. As the remainder is concentrated, the evaporated vapor becomes increasingly flammable. In a work process, a treatment tank is used for chemically treating work pieces in a volatile treatment fluid which has a liquid phase and a relatively non-flammable heavier-than-air vapor phase. In this process, heat energy is added to the fluid to maintain the upper vapor phase surface at a substantial distance above the upper liquid phase surface in the tank. When the treatment fluid becomes sufficiently contaminated with dirt introduced by the work pieces or otherwise, it must be removed from the tank and replaced with clean treatment fluid. The invention involves reclaiming the used volatile treatment fluid by confining it in a closed boiling vessel and boiling it off through a conduit back into the vapor phase of the fresh fluid in an active operating treatment tank to immediately combine the increasingly flammable evaporated vapors into the relatively non-flammable treatment fluid vapor in the treatment tank where the flammable constituents of those vapors will be condensed to join the liquid phase of the fresh fluid in the treatment tank.

1 Claim, 4 Drawing Figures

SOLVENT RECOVERY APPARATUS

BACKGROUND OF THE INVENTION

It has been well known for a long time to subject metal work pieces to phosphatizing or other chemical treatment in a tank in which a two-phase fluid is present, the liquid phase being subjected to heat sufficient to form and maintain a vapor phase above it. See the patent to Sabatka, U.S. Pat. No. 3,896,829, granted July 29, 1975, and the publications set out therein where trichlorethylene is in solution with alcohols. When dirt from the metal work pieces contaminates the volatile two-phase treatment fluid to the point where the process is substantially impeded thereby, the treatment fluid must be removed from the treatment tank and replaced with clean treatment fluid.

Before the present invention, a leading purveyor of apparatus to perform the phosphatizing operation and of the chemicals used therein recommended the reclaiming of only up to half of the dirty treatment fluid by boiling and distillation. Continuation of the boiling and distillation process after half of the dirty treatment fluid has been boiled off and reclaimed was not recommended because of the fire hazard condition which resulted due to further concentration of the fluid. This is because the non-flammable constituents boil off first, leaving the flammable to boil off last.

If these recommendations are followed, the remaining concentrated dirty half of the treatment fluid has to be somehow disposed of hopefully without polluting the environment. The apparatus purveyor has no effective recommendations as to how this can be done.

Changing of fluid in a treatment tank utilizing 1800 gallons (6815 liters) of treatment fluid in liquid form results in the loss by disposal of 900 gallons (3408 liters) of treatment fluid. At a present cost of about $3.50 per gallon, this is a loss of $3150 per treatment fluid change.

An apparatus and method were needed to reclaim a much larger percentage of the relatively expensive and highly polluting treatment fluid in a manner which would not present a fire and explosion hazard; and to concentrate the contaminated, dirty and deleterious residue sufficiently so that it could economically and safely be completely disposed of.

To meet these needs, the apparatus and method of the present invention were developed.

BRIEF SUMMARY OF THE INVENTION

A dirty or otherwise contaminated volatile solvent or other treatment fluid including relatively less volatile flammable constituents is reclaimed by boiling to drive off a very high percentage of its volatile elements. This evaporated vapor is fed into the vapor in a tank in which a fluid having a vapor phase of relatively more volatile non-flammable constituents exists over a liquid phase thereof.

The apparatus for boiling the contaminated treatment fluid can consist of an otherwise closed boiling vessel open through a conduit at a top portion thereof to the interior of a tank at a position inside the tank below the upper surface of the vapor phase of the fluid in the tank and above the upper surface of the liquid phase of the fluid therein.

Any usual or preferred means for applying heat to the boiling vessel and to the tank can be employed. A thermostat or similar device can be installed in the tank to insure that vapor is present in the tank above the level where evaporated vapor from the contaminated fluid is to be introduced before the heat is applied to the boiling vessel.

Means is provided to remove the residue from the boiling vessel after the reclamation of the treatment fluid has been completed.

IN THE DRAWINGS

DESCRIPTION OF PREFERRED EMBODIMENTS

Figure 1:
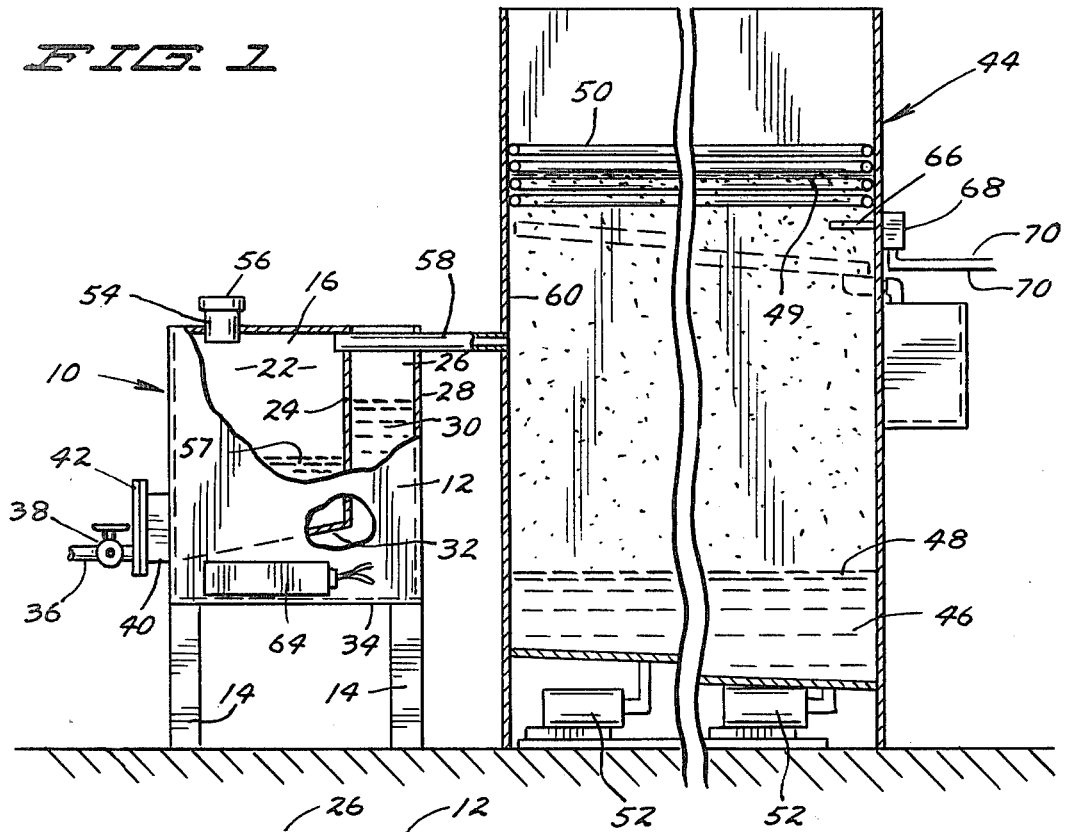
FIG. 1 is a side elevational view of a solvent recovery apparatus of the present invention with parts in section and parts broken away and showing its connection to a treatment tank utilizing a volatile treatment fluid having a liquid phase and a heavier-than-air vapor phase.
Figure 2:
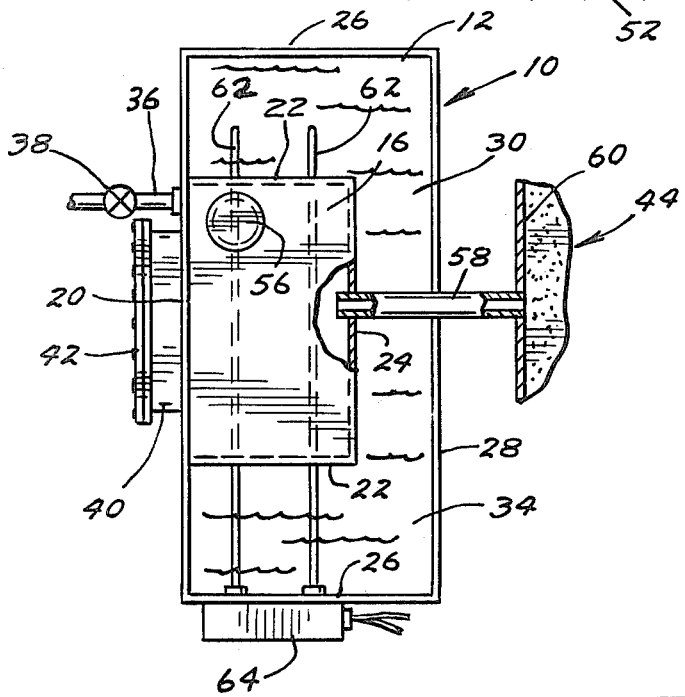
FIG. 2 is a top plan view of the solvent recovery apparatus of FIG. 1, with parts in section and parts broken away.
Figure 3:
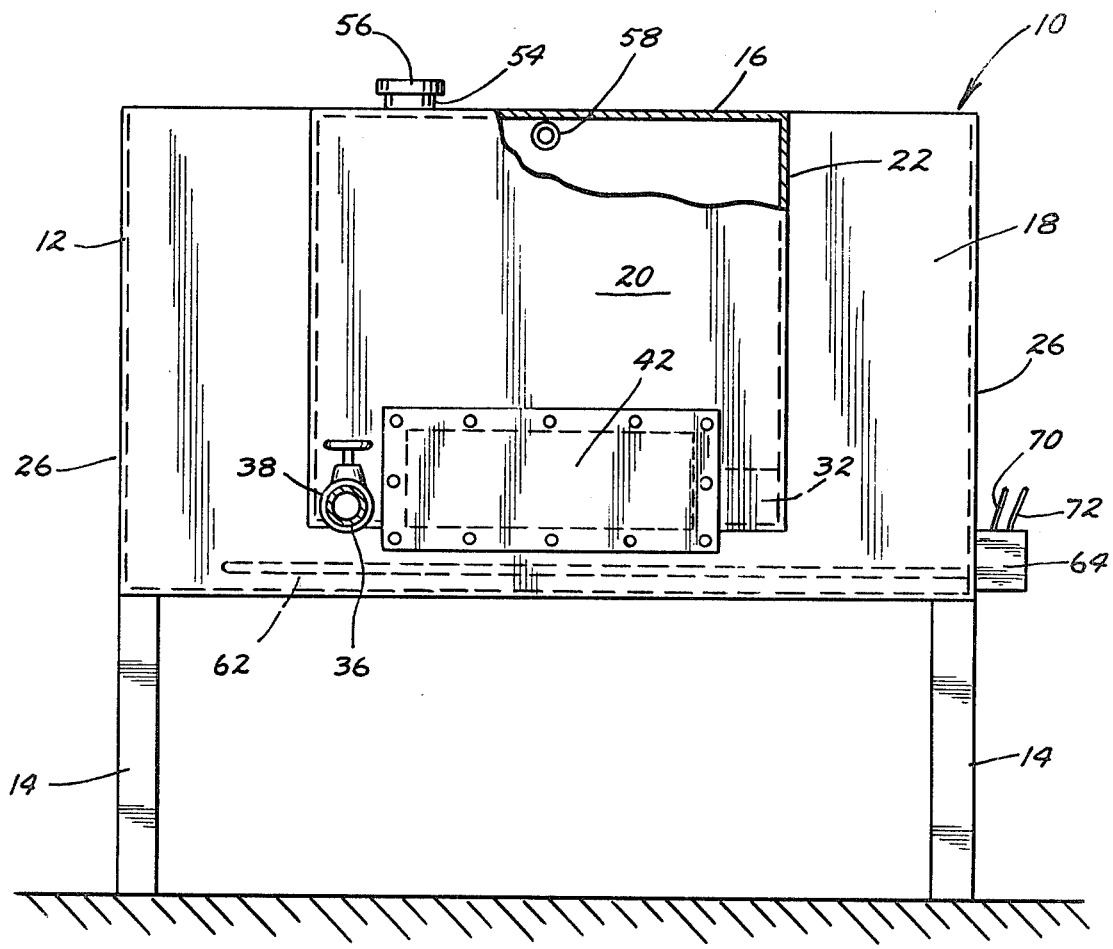
FIG. 3 is an enlarged front elevational view of the apparatus of FIGS. 1 and 2 with parts in section and parts broken away.

A solvent recovery apparatus 10 includes an outer water jacket 12 supported on feet 14. Inside of the jacket 12 is supported a closed solvent boiling vessel or other treatment fluid boiling vessel 16. As shown, the outer jacket 12 and the boiling vessel 16 have front walls 18 and 20 respectively which lie in substantially the same vertical plane. Vertical side walls 22,22 and back wall 24 of the vessel 16 are each parallel to but spaced substantially from one of corresponding vertical side walls 26,26 and back wall 28 of the outer water jacket 12 to form a water bath 30 around three sides of the vessel 16. A bottom floor 32 of the vessel 16 is also spaced from a bottom horizontal floor 34 of the jacket 12; but is at a downward angle toward the front wall 20 to allow for ease of removal of residue from the jacket.

The boiling vessel 16 is provided with a drain pipe 36 open through the front wall 20 thereof; and a manual drain valve 38 closes the drain pipe until such time as the residue from reclaiming of a batch of treatment fluid is to be drawn off.

A large clean-out chute 40 extends outwardly from the bottom floor 32 of the boiling vessel 16 through the front wall 20 thereof, and is normally sealed off by a clean-out chute door 42.

A treatment tank 44 for use with the solvent recovery apparatus 10 of the invention is somewhat schematically shown in FIG. 1. The treatment tank 44 has a fresh, active and working treatment fluid 46 therein, the upper surface of the liquid phase of this fluid 46 being indicated at 48. The upper surface of the vapor phase of the working treatment fluid is maintained approximately at the position indicated at 49 by means of chilling coils 50. Means 52 is provided for adding heat to the liquid phase of the fluid 46 to maintain the vapor phase at the indicated level. The treatment tank 44 and the apparatus used in connection with it can take many forms, but one satisfactory form is illustrated in U.S. Pat. No. 3,896,829, granted in July of 1975 to W. E. Sabatka. The fluid 44 will have a relatively highly volatile vapor phase which is largely non-flammable and a less volatile liquid phase.

The boiling vessel 16 includes a fill pipe 54 normally closed by a fill pipe cap 56. Contaminated, used, treatment fluid 57 to be reclaimed is poured into the boiling vessel 16 through the fill pipe 54 after the cap 56 has been removed. When the fill pipe is closed by the cap, and the drain pipe 36 and clean-out chute 40 are closed by drain valve 38 and clean-out chute door 42, respectively, the boiling vessel 16 is completely closed with the exception of an evaporation vapor conduit 58 which is situated in sealing relationship to vertical back wall 24 of the boiling vessel 16 and to a vertical side wall 60 of the treatment tank 44. This conduit 58 is open through those walls from the upper interior of the boiling vessel 16 to the interior of treatment tank 44 well below the upper surface 49 of the vapor phase of the working treatment fluid 46 and well above the upper surface 48 of the liquid phase of that treatment fluid.

Typically, the used fluid 57 to be reclaimed will include constituents which when heated to become vaporized are flammable. These flammable constituents will be less volatile than the constituents forming the vapor phase of treatment fluid 46 so that they will be cooled when they reach the fluid 46 vapor phase and will condense out to join the fluid 46 liquid phase.

In the form of the invention shown, heat to boil the contaminated, used treatment fluid 57 is added to the water bath 30 by a pair of immersion heaters 62,62 extending through the vertical side wall 26 of the water jacket 12 to an immersion heater junction box 64. However, any usual or preferred method can be used to steadily raise the temperature of the contaminated treatment fluid 57 to casue the volatile constituents to be evaporated and forced over through the conduit 58. For example, steam pipes could be provided in the water bath, the water jacket fired by gas or oil, etc., etc.

In the form of the invention shown, a "vapor up" thermostat 66 is positioned just below the top of the desired upper surface level 49 of the vapor phase of the active, working treatment fluid 46, and will extend through a vertical side wall of the treatment tank 44 to a "vapor up" control junction box 68. When the thermostat registers a temperature which is roughly equivalent to the boiling point of the working treatment fluid 46, then the vapor will have reached the thermostat, and it will be safe to fire up the boiling vessel 16 to reclaim the contaminated fluid or used solvent 57.

Figure 4:
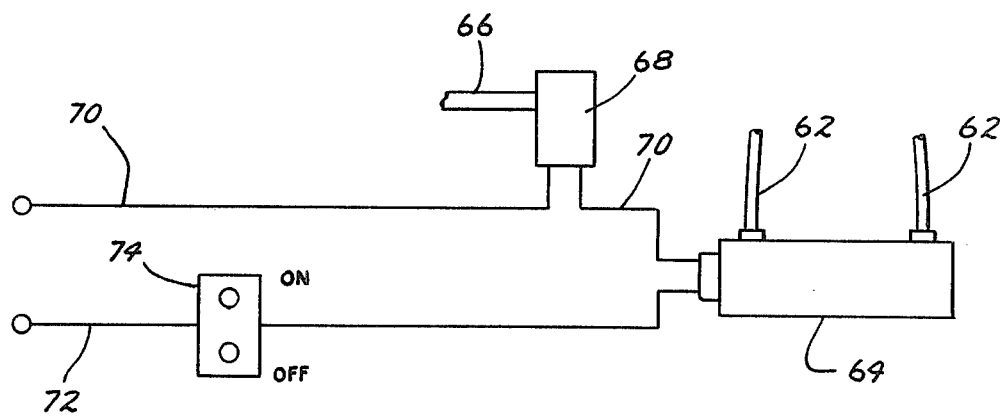
FIG. 4 is a diagrammatic representation of an electrical conrol circuit for use with the treatment tank and the solvent recovery apparatus of FIGS. 1 through 3.

As seen in FIG. 4, main electrical power lines 70 and 72 are for the purpose of heating the immersion heaters 62,62. When the thermostat 66 reaches a temperature indicating that the vapor phase of the working fluid 46 is at least as high in tank 44 as the thermostat, it causes a normally open switch in control junction box 68 to close. Then when "ON-OFF" switch 74 in line 72 is closed, energy will reach heater junction box 64 and heaters 62,62 to heat the water bath 30 and consequently the boiling vessel 16 to cause the volatile constituents of the contaminated fluid 57 to be forced into the vapor phase of fresh, working fluid 46 in tank 44.

OPERATION

When a solvent or other used treatment fluid 57 is made up of constituents such as methylene chloride and methyl alcohol, the first volatile constituent to come off upon the application of heat is mostly methylene chloride. This first vapor including primarily methylene chloride is largely non-flammable, and working with a treatment fluid with methylene chloride vapor phase on top of the liquid phase does not present an undue fire hazard. However, when the evaporation of the contaminated treatment fluid 57 continues, the vapors coming over and leaving the boiling vessel 16 will be increasingly flammable, unitl, at the termination of the procedure, these vapors will be highly flammable indeed.

When the apparatus is activated as set out above, first the methylene chloride rich vapors will be forced over into the methylene chloride vapors in the treatment tank 44, and will combine with those vapors to perform the desired action on the work pieces which may be going through processing and treatment tank 44 during this reclamation procedure. As the boiling vessel 16 and the contaminated fluid 57 get hotter, the less volatile and more highly flammable vapors will be forced over into the vapors in the treatment tank. Because of the higher temperature of the incoming vapors from the reclaimed treatment fluid, when they mix with the vapors in the treatment tank 44, these more highly flammable, and less volatile, constituents will be "cooled" by the vapors in treatment tank 44, and will fall back into the liquid phase in the treatment tank 44, now becoming part of the fresh, active working treatment fluid 46.

The remainder of the contaminated fluid 57 will, as the volatile constituents are forced over and away, become more and more concentrated with dirt and other contamination. As a practical matter, it has been found that 90% of the volume of contaminated treatment fluid can be forced over by this method, leaving a residual slurry or sludge of only 10% of the original volume to be drained out of the drain pipe 36 by the opening of the drain valve 38, or to be scraped or otherwise drawn out of the interior of the boiling vessel 16 through clean-out chute 40 after clean-out chute door 42 has been removed.

In the example given earlier, half of an 1800 gallon (6815 liter) batch of fluid was to be thrown away at a loss of $3150. In an actual test with an 1800 gallon (6815 liter) batch of contaminated treatment fluid reclaimed according to the method of the invention, however, only 10% by volume was discarded as residue. So only 180 gallons (682 liters) was lost from original volume, thus cutting the loss per batch to $630. This is a saving of $2520 per batch over the old and recommended method.

The disposal problem has also been reduced from having to get rid of 900 gallons (3408 liters) of concentrated and highly contaminated methylene chloride and methyl alcohol to disposing of 180 gallons (682 liters) or less of a sludge which is primarily dirt and other contaminating elements, containing practically no methylene chloride, and very little methyl alcohol.

A specific example as to the use of this apparatus and method in regard to the processing of work pieces through solvent work treatment solutions to phosphatize the work surfaces preparatory to painting has been disclosed and discussed. However, the method of the invention will be useful for reclaiming any kind of volatile flammable treatment fluid by combining it into a more volatile non-flammable vapor phase of a two-phase fluid.

In the example given, the most volatile constituent forming the vapor layer above the liquid layer is a heavier-than-air vapor. When the less volatile constituents come over, the effect of the vapor and condensing coils in the treatment tank is to cool these constituents down below their boiling point, and to cause them to fall into and combine with the liquid phase of the fluid in a treatment tank. Thus there is no tendency to lose less volatile but lighter constituents in the process of reclaiming the contaminated treatment fluid.

The embodiments of the invention in which an exclusive property or privilege is claimed are defined as follows:

1. In combination with a treatment tank having therein a first volatile treatment fluid having at least a first relatively highly volatile ingredient which is non-flammable in vapor phase and having at least a second ingredient which is flammable in vapor phase and relatively less volatile than said first ingredient and having therein a second treatment fluid having at least one ingredient which is more highly volatile than the second ingredient in said first fluid and which, when heated, forms a heavier-than-air vapor phase over its liquid phase, and in combination with treatment means for applying heat energy to a bottom portion of said treatment tank to cause said second fluid to form in said tank such a vapor phase over such a liquid phase, a treatment fluid recovery apparatus for recovering said first volatile treatment fluid from a mixture of said first fluid and non-volatile constituents; said treatment fluid recovery apparatus including:
   A. a boiling vessel;
   B. means to introduce a mixture of such a first volatile fluid and non-volatile constituents into said vessel;
   C. energy means to continuously add heat energy to said mixture to cause said first fluid to progressively and continuously vaporize; and
   D. transfer means to continuously introduce vapor from said first fluid in said boiling vessel into said tank above the top surface of the liquid phase of such second volatile fluid and below a vapor phase of such second volatile fluid;
   E. control means to initiate and interrupt the application of heat energy to said mixture in said boiling vessel; and
   F. a "vapor-up" measuring device associated with said tank operative on said control means to allow said control means to initiate application of heat energy to said mixture in said boiling vessel only when the vapor phase of said second fluid is above a predetermined upper position in said tank above the point of discharge of vapor from said first fluid into said tank.

* * * * *